(12) United States Patent
Wanninger et al.

(10) Patent No.: US 7,607,804 B2
(45) Date of Patent: Oct. 27, 2009

(54) LIGHTING MEANS HAVING A PRIMARY OPTICS ELEMENT AND AN OPTICAL APPARATUS

(75) Inventors: Mario Wanninger, Harting (DE); Alexander Wilm, Regensburg (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 12/218,540

(22) Filed: Jul. 16, 2008

(65) Prior Publication Data

US 2009/0129080 A1    May 21, 2009

Related U.S. Application Data

(62) Division of application No. 11/213,515, filed on Aug. 26, 2005, now Pat. No. 7,401,947.

(30) Foreign Application Priority Data

| Aug. 27, 2004 | (DE) | ................ 10 2004 041 872 |
| Mar. 31, 2005 | (DE) | ................ 10 2005 015 149 |
| Apr. 15, 2005 | (DE) | ................ 10 2005 017 528 |

(51) Int. Cl.
*F21V 7/09* (2006.01)
*H01P 5/00* (2006.01)

(52) U.S. Cl. .............. 362/300; 362/558; 362/511; 362/307

(58) Field of Classification Search .......... 362/511, 362/514, 545, 300, 307, 558; 257/98
See application file for complete search history.

(56) References Cited

U.S. PATENT DOCUMENTS

| 3,529,200 | A | 9/1970 | Potter et al. |
| 4,389,698 | A | 6/1983 | Cibie |
| 4,811,172 | A | 3/1989 | Davenport et al. |
| 5,208,462 | A | 5/1993 | O'Connor et al. |
| 5,257,168 | A | 10/1993 | Davenport et al. |
| 5,535,230 | A | 7/1996 | Abe |
| 5,727,108 | A | 3/1998 | Hed |
| 5,764,828 | A | 6/1998 | Iga et al. |
| 6,192,176 | B1 | 2/2001 | Cassarly et al. |

(Continued)

FOREIGN PATENT DOCUMENTS

DE    101 58 395 A1    6/2003

(Continued)

OTHER PUBLICATIONS

I. Schnitzer, et al., "30% external quantum efficiency from surface textured, thin-film light-emitting diode", Appl. Phys. Lett., vol. 63, No. 16, pp. 2174-2176, Oct. 18, 1993.

*Primary Examiner*—Ismael Negron
(74) *Attorney, Agent, or Firm*—Cohen Pontani Lieberman & Pavane LLP

(57) ABSTRACT

A lighting device with a light source followed by an optical apparatus in an emission direction, and a primary optics element with a light inlet and a light outlet being arranged between the light source and the optical apparatus. The primary optics element is designed such that desired characteristics of the light beam are formed within the primary optics element by deliberate reflections on specially shaped reflective surfaces of the primary optics element.

30 Claims, 10 Drawing Sheets

U.S. PATENT DOCUMENTS

| | | |
|---|---|---|
| 6,367,957 B1 | 4/2002 | Hering et al. |
| 6,491,420 B1 | 12/2002 | Scifres |
| 6,527,411 B1 | 3/2003 | Sayers |
| 6,600,175 B1 | 7/2003 | Baretz et al. |
| 6,837,605 B2 | 1/2005 | Reill |
| 7,097,334 B2 | 8/2006 | Ishida et al. |
| 2003/0085642 A1 | 5/2003 | Pelka et al. |
| 2004/0246739 A1 | 12/2004 | Gebauer |
| 2004/0264185 A1 | 12/2004 | Grotsch et al. |
| 2005/0117366 A1 | 6/2005 | Simbal |
| 2006/0083013 A1 | 4/2006 | Wanninger et al. |

FOREIGN PATENT DOCUMENTS

| | | |
|---|---|---|
| DE | 102 04 481 A1 | 8/2003 |
| DE | 102 52 228 A1 | 8/2003 |
| DE | 103 02 969 A1 | 8/2004 |
| DE | 103 25 330 A1 | 12/2004 |

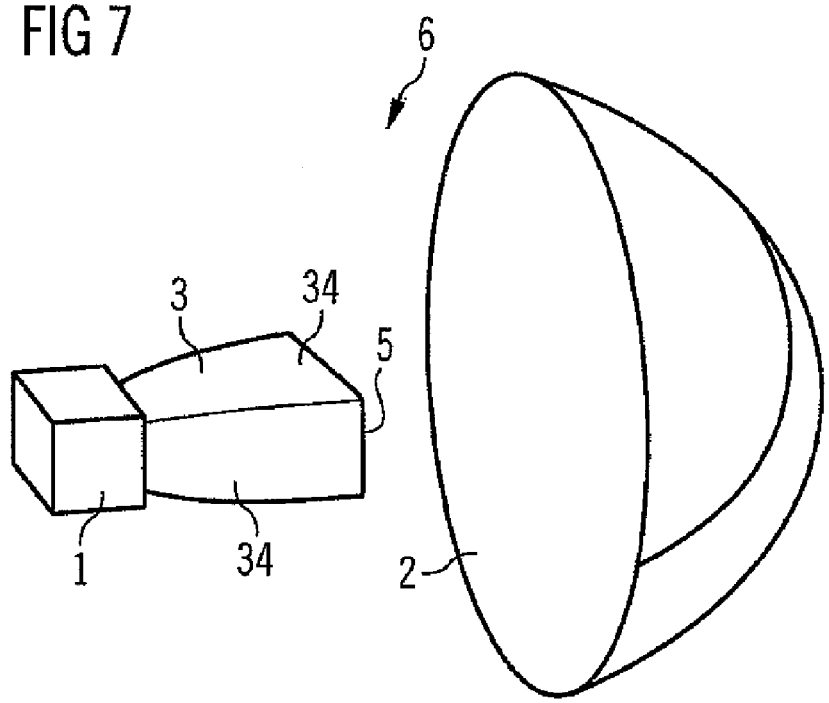
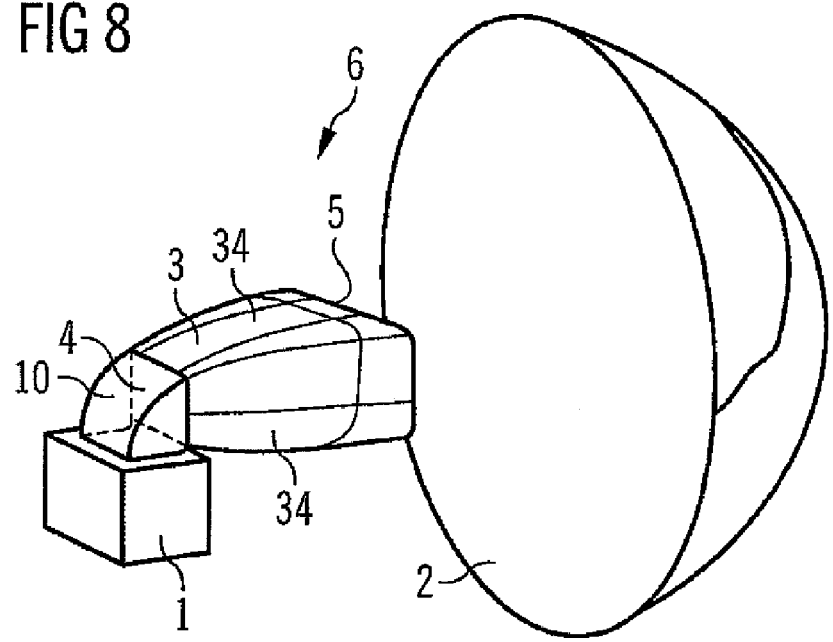

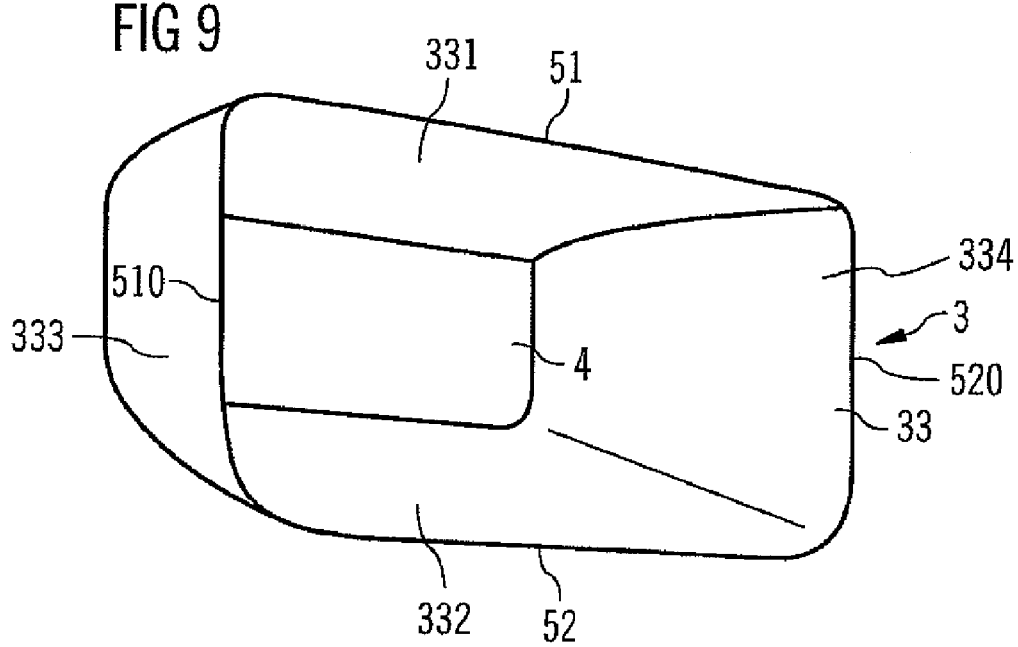
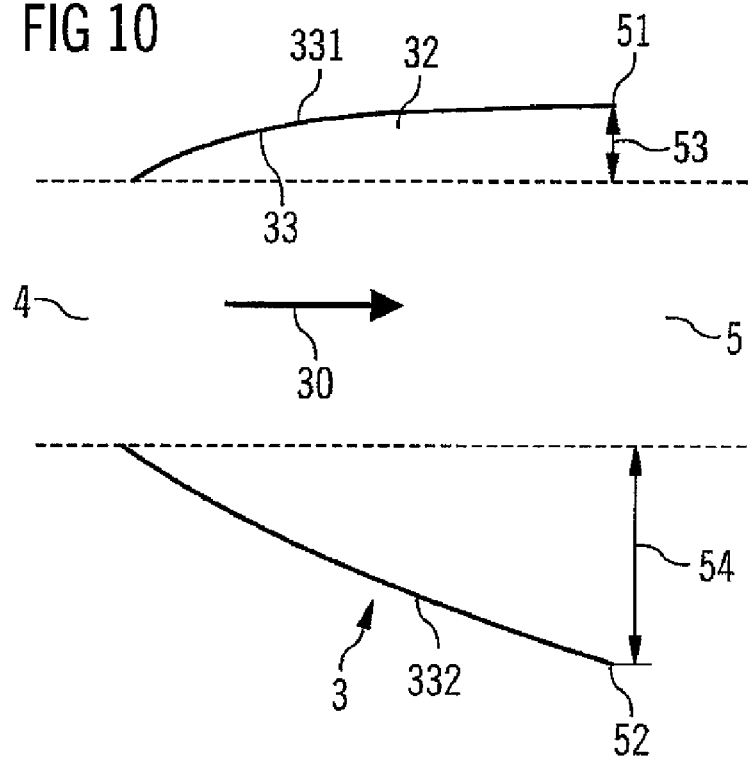

FIG 20
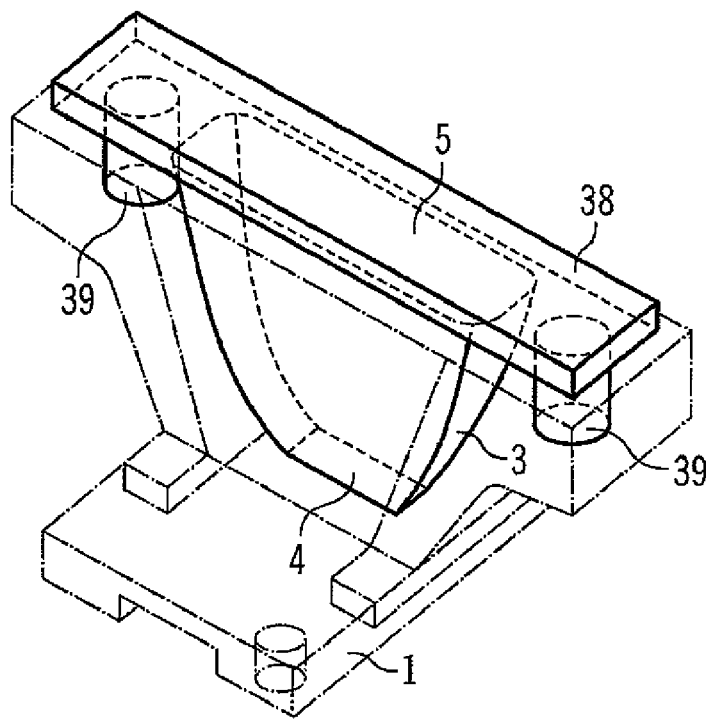
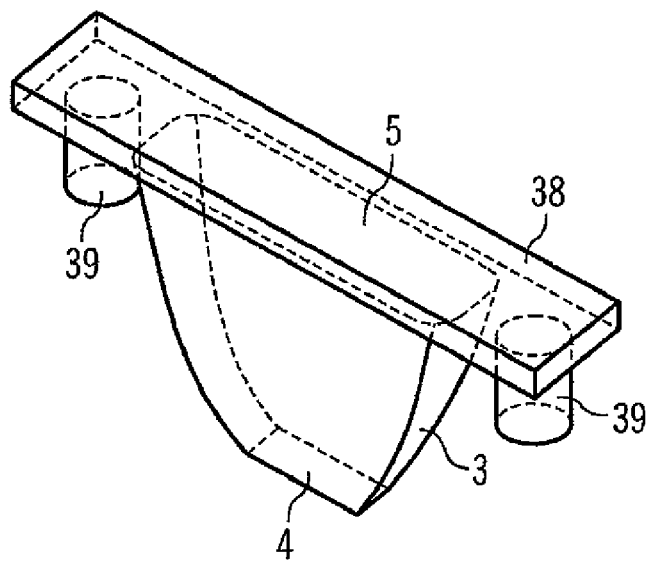

Surface points Fig 21

Fig 23

| Point | X | Z |
|---|---|---|
| 1 | 2,54 | 0,00 |
| 2 | 3,25 | 1,00 |
| 3 | 3,85 | 2,00 |
| 4 | 4,38 | 3,00 |
| 5 | 4,85 | 4,00 |
| 6 | 5,27 | 5,00 |
| 7 | 5,65 | 6,00 |
| 8 | 6,00 | 7,00 |
| 9 | 6,32 | 8,00 |
| 10 | 6,62 | 9,00 |
| 11 | 6,89 | 10,00 |
| 12 | 7,14 | 11,00 |
| 13 | 7,38 | 12,00 |
| 14 | 7,60 | 13,00 |
| 15 | 7,81 | 14,00 |
| 16 | 8,00 | 15,00 |

Surface points Fig 22

Fig 24

| Point | Y | Z |
|---|---|---|
| 1 | 0,66 | 0,00 |
| 2 | 1,03 | 1,00 |
| 3 | 1,27 | 2,00 |
| 4 | 1,48 | 3,00 |
| 5 | 1,56 | 4,00 |
| 6 | 1,60 | 5,00 |
| 7 | 1,61 | 6,00 |
| 8 | 1,62 | 7,00 |
| 9 | 1,62 | 8,00 |
| 10 | 1,62 | 9,00 |
| 11 | 1,62 | 11,00 |
| 12 | 1,62 | 15,00 |
| 13 | -0,55 | 0,00 |
| 14 | -1,22 | 1,00 |
| 15 | -1,69 | 2,00 |
| 16 | -2,03 | 3,00 |
| 17 | -2,28 | 4,00 |
| 18 | -2,47 | 5,00 |
| 19 | -2,62 | 6,00 |
| 20 | -2,78 | 7,00 |
| 21 | -2,85 | 8,00 |
| 22 | -2,92 | 9,00 |
| 23 | -2,98 | 10,00 |
| 24 | -3,01 | 11,00 |
| 25 | -3,02 | 12,00 |
| 26 | -3,03 | 13,00 |
| 27 | -3,05 | 14,00 |
| 28 | -3,11 | 15,00 |

LIGHTING MEANS HAVING A PRIMARY OPTICS ELEMENT AND AN OPTICAL APPARATUS

RELATED APPLICATIONS

This patent application is a divisional of U.S. patent application Ser. No. 11/213,515 filed Aug. 26, 2005 now U.S. Pat. No. 7,401,947 and claims the priority of German Patent Application nos. 10 2004 041 872.1 filed Aug. 27, 2004, 10 2005 015 149.3 filed Mar. 31, 2005 and 10 2005 017 528.7 filed Apr. 15, 2005, the respective disclosures of which are hereby incorporated by reference.

FIELD OF THE INVENTION

The present invention relates to a lighting means having a predetermined emission characteristic, and to a primary optics element for a lighting means such as this.

BACKGROUND OF THE INVENTION

Lighting means such as these are used, for example, for headlights in motor vehicles. In many countries, legal specifications are provided for the emission characteristic of motor vehicle headlights and, inter alia, are intended to ensure both adequate illumination of the area of the travel for the motor vehicle driver and the avoidance of dazzling the oncoming traffic. Sharp light/dark transitions are generally specified for the emission characteristic in this case.

In conventional headlights, an incandescent lamp or discharge lamp is provided as the light source. The predetermined emission characteristic is in this case achieved by means of so-called "shutters" in the form of diaphragms or blades, which are arranged in the beam path, and possibly optics such as a reflector with a downstream lens. These shutters are used in particular in order to achieve sharp light/dark transitions.

However, shutters such as these absorb the light striking them or deflect it in an undesirable direction, so that it is no longer available as useful light. This reduces the efficiency of a corresponding headlight.

SUMMARY OF THE INVENTION

One object of the present invention is to provide a lighting means of the type mentioned initially which is more efficient.

Another object of the invention is to provide an advantageous primary optics element for a lighting means such as this.

This and other objects are attained in accordance with one aspect of the present invention directed to lighting means, in particular a headlight lighting means, having a light source and an optical apparatus which is arranged downstream from the light source in an emission direction. A primary optics element with a light inlet and a light outlet is arranged between the light source and the optical apparatus and is designed such that an emission characteristic which corresponds to a predetermined emission characteristic is formed by deliberate reflections in the primary optics element, and deliberate projection of the light outlet or of an imaginary surface, which is located in a beam path of the light emitted from the light source, by means of the optical apparatus.

The imaginary surface may be arranged downstream from the light output in an emission direction, or may be located completely or partially within the primary optics element. It may be planar, non-planar and/or curved.

In one embodiment of the lighting means, the predetermined emission characteristic is advantageously achieved by means of appropriate shaping of the cross section of the light outlet of the primary optics element in conjunction with the projection of the light outlet surface or of the imaginary surface.

The formation of a desired emission characteristic can comprise deliberate reflections in the primary optics element, that is to say the primary optics element is designed such that desired characteristics of the light beam are formed within the primary optics element by deliberate reflections on specially shaped and/or specially running reflective surfaces of the primary optics element, thus making it possible to produce an emission characteristic which corresponds to the predetermined emission characteristic of the lighting means, essentially by projection of a real or imaginary surface, which the light beam strikes, by means of an optical apparatus.

The lighting means can be a headlight lighting means, in particular for transport apparatuses such as motor vehicles, trains, aircraft or the like.

The intended emission characteristic can comprise a light beam which has an inhomogeneous luminance distribution in a cross section at right angles to a main emission direction. This can be provided by a single lighting means.

The light beam can be a brightest area or a plurality of mutually adjacent brightest areas at one edge of the cross section. The brightest area may, for example, be used to illuminate a road in the direction of travel, while the opposite roadway and the edges of the road are illuminated with a lesser radiation intensity. In order to produce the brightest area, the light is focused onto a section of the first longitudinal face of the light outlet, or in the vicinity of the first longitudinal face.

Additionally or alternatively, the light beam has an abrupt light/dark transition at an edge of the cross section. The expression "abrupt" transition should be understood as meaning that a cross section of the light beam has a reduction in the light intensity by at least 90%, preferably by at least 95%, and particularly preferably by at least 98%, at an edge within an area which is small in comparison to the cross-sectional area. The width of the area in which the light intensity is reduced abruptly is advantageously at least ten times, preferably at least 15 times, and particularly preferably at least 20 times less than the maximum extent of the cross section of the light beam. The governing factor is, in particular, advantageously the cross section of the light beam at a distance of 25 m from the lighting means. At a distance such as this from the lighting means, the emitted light beam should preferably also have all of the other predetermined characteristics. This applies in particular to headlight lighting means, in which the emission characteristic in the far field is generally important. A light/dark transition such as this makes it possible to avoid illumination of undesirable or superfluous areas, while at the same time achieving efficient illumination of desired areas.

In one preferred embodiment of the lighting means, a contour of the abrupt light/dark transition has two subsections, having main extent directions that are inclined with respect to one another such that they include an angle of less or equal to 170° or greater than or equal to 160° on an outer face of the cross section of the light beam. A light beam with a shape such as this is particularly preferable for a dipped beam for motor vehicles. This can be produced in a simple and efficient manner by the lighting means.

According to a further embodiment, the light source has at least one light-emitting diode (LED). It preferably has a plurality of light-emitting diodes. The plurality of light-emitting diodes are advantageously arranged in a linear arrangement.

The association of a plurality of light-emitting diodes with a single primary optics element allows the lighting means to be designed with particularly high light intensity but compact dimensions. Furthermore, deliberate matching of the primary optics element to a plurality of light-emitting diodes is advantageous for the efficient implementation of a desired emission characteristic.

The light-emitting diode expediently has a radiation-emitting semiconductor body and a luminescence conversion element, with the luminescence conversion element at least partially converting radiation which is produced by the semiconductor body to radiation at a different wavelength. In particular, this makes it possible to produce white light. For this purpose, the radiation which is produced by the semiconductor body and the radiation which is produced by the luminescence conversion element are advantageously mixed in the primary optics element.

The luminescence conversion element is expediently applied to the semiconductor body, preferably in the form of a layer.

According to one particularly preferred embodiment of the lighting means, the light inlet has a light inlet surface or a light inlet opening which has a width of less than or equal to 1.5 times, and preferably less than or equal to 1.25 times, the lateral extent of the light-emitting diode or light-emitting diodes, with the lateral extent of the light-emitting diode or light emitting diodes being measured along the width of the light inlet surface or light inlet opening.

A small light inlet such as this is advantageous in order to reduce the spatial angle in which the electromagnetic radiation is emitted, with the optical element as close as possible to the semiconductor chip, where the cross-sectional area of the primary optics element, and thus of the radiated beam as well, is small. This is particularly advantageous when the lighting means is intended to be suitable for projection of as high a radiation intensity as possible onto as small an area as possible. One important conservation parameter in geometric optics is in this case the etendue, that is to say the radiation density. This is the product of the area content of a light source and the spatial angle into which it emits. The maintenance of the etendue inter alia has the consequence that the light from a diffuse radiation source, for example a semiconductor light-emitting diode, can no longer be concentrated, that is to say it can no longer be reflected onto an area with a smaller extent, for which reason it is advantageous for the light beam to enter the optical element with as small a cross section as possible.

In order to allow all of the radiation that is emitted from the semiconductor chip to enter the optical element with a small light inlet, it is correspondingly necessary for the light inlet and the light-emitting diode chip to be as close to one another as possible. The separation is advantageously less than 50 µm, particularly preferably less than 30 µm, and particularly preferably less than 10 µm. Alternatively, the at least one light-emitting diode chip is immediately adjacent to the light inlet. If the light-emitting diode chip is provided with a luminescence conversion material, this is correspondingly adjacent to the light inlet.

The primary optics element preferably reduces divergence of an arriving light beam in such a way that the light beam, after it emerges from the light outlet, has a beam angle of between 0 and 45°, preferably between 0 and 30°, in each case including the limits.

The light source preferably emits white light.

The optical apparatus is expediently a lens or a lens assembly. The optical apparatus advantageously has at least one freeform lens.

A primary optics element which is suitable for the lighting means is preferably designed in the form of a non-imaging concentrator. Compared with the normal use of a concentrator, this is intended for radiation to pass through it in the opposite direction. A concentrator such as this expediently has a light inlet which has a smaller cross-sectional area than the light outlet.

The primary optics element advantageously has reflective side walls which extend from the light inlet to the light outlet and are suitable for deliberately reflecting light, such that it is possible to form a light beam with desired characteristics. The characteristics of the light beam are, in particular, little divergence, a specific cross-sectional shape, abrupt light/dark transitions, and/or a luminance distribution or illumination intensity distribution whose cross section is not homogeneous. In addition, the light is advantageously mixed as it passes from the light inlet to the light outlet, so that the primary optics element is non-imaging. The light is preferably mixed in such a way that a radiation characteristic of an incident light beam on the light inlet side is lost as a result of the mixing, or is significantly modified in order to achieve an intended emission characteristic.

A light outlet of the primary optics element, seen in the form of plan view, can have a contour with a long shape, which has a first longitudinal face and a second longitudinal face opposite the first longitudinal face.

The first longitudinal face can be closer to the light inlet than the second longitudinal face. This makes it possible, in particular, to image non-homogeneous luminance distributions efficiently at the light outlet.

In one embodiment, the primary optics element has a base body which defines a cavity having an internal wall that is reflective at least for a spectral subrange of visible electromagnetic radiation. A primary optics element such as this can be combined well with a light source which, for example, can be arranged within the cavity and/or can be integrated in the base body.

Alternatively, the primary optics element is designed in the form of a dielectric concentrator, having a base body that is a solid body composed of a dielectric material with a suitable refractive index, such that light which is input via the light inlet is reflected by total internal reflection on side boundary surfaces of the solid body to the surrounding medium, with these side boundary surfaces connecting the light inlet to the light output. Owing to the high efficiency of total internal reflection, this embodiment makes it possible to achieve particularly high efficiency.

The primary optics element can be designed such that it collimates light entering through the light inlet by means of internal reflections, that is to say it reduces divergence of the entering light. In particular, it is possible to use for this purpose a primary optics element which is designed in the form of a concentrator and is intended for radiation to pass through it in the opposite direction, compared with the normal use of a concentrator.

The primary optics element can be designed such that it images light entering through the light inlet on the light outlet or an imaginary surface with an inhomogeneous luminance distribution, which corresponds essentially to an intended luminance distribution. The imaginary surface is arranged in a beam path which is predetermined by the path of the radiation in the primary optics element. The imaginary surface can be arranged downstream from the light outlet, in an emission direction of the primary optics element.

Inhomogeneous luminance distributions or illumination intensity distributions are required for a large number of applications, in particular for motor vehicle headlights, as well. These can be achieved by means of a single primary optics element, which allows the lighting means to have compact shapes. Alternatively, a plurality of primary optics elements can also be combined in one lighting means, or a plurality of lighting means can be combined with one another in order to achieve a desired luminance distribution or illumination intensity distribution.

The primary optics element can be designed such that it mixes light entering through the light inlet by means of internal reflections. This makes it possible to ensure that the light characteristic which is imaged at the light outlet is essentially independent of the light characteristic entering the light inlet.

In one embodiment, the primary optics element has a cross section in the form of a polygon which has at least one rounded corner, on the light outlet side. In other words, the cross section is essentially in the form of a polygon, preferably in the form of a rectangle or pentagon, but with at least one or all of the corners of this polygon not being angled, but being rounded. This allows the profile of the light/dark transition to be weakened, and thus adjusted.

On the other hand, a primary optics element which has an angled cross section at least on the light outlet side makes it possible to achieve more homogeneous mixing of the light, so that, alternatively, the corners can also not be rounded.

A primary optics element with rounded corners can be produced more easily, for example by means of a spraying method such as injection moulding or transfer moulding, since corners are more difficult to fill with production methods such as these.

Additionally or alternatively, at least in one section on the light inlet side, the primary optics element has a plurality of light channels, which are arranged alongside one another, extend in the direction of the light outlet and merge into one another at the sides. The light channels can each have a round cross section. The light channels allow the light which enters through the light inlet to be provided with a preferred direction within the primary optics element, as is advantageous for the production of specific inhomogeneous luminance distributions.

In their profile to the light outlet, the light channels can run together in such a way that at least one light channel merges completely into the other light channels. This makes it possible to guide, in particular to focus, light from different light channels onto a common area.

In the vicinity of the light outlet, the primary optics element has a cross sectional shape in the form of a predetermined cross-sectional shape for a light beam to be emitted. This makes it possible to achieve, in particular, sharp light/dark transitions without the use of shutters, and to improve the efficiency of lighting means with such primary optics elements, in a corresponding manner. The cross-sectional shape according to a further advantageous embodiment is asymmetric.

The first longitudinal face of the light outlet can have two subsections whose main extent directions are inclined with respect to one another such that they include an angle of less or equal to 170° and greater than or equal to 160° on an outer face of the cross section of the light beam. A section of the primary optics element can also have a longitudinal face designed in this way in the vicinity of the light outlet. This makes it possible to produce a light beam with a shape which is particularly advantageous for motor vehicle dipped beams.

The primary optics element can be in the form of a compound parabolic concentrator (CPC), a compound elliptical concentrator (CEC) or a compound hyperbolic concentrator (CHC). The reflective surfaces of the primary optics element are particularly advantageously freeform surfaces, in order to optimally set a desired emission characteristic, with the basic shape of the primary optics element preferably being similar to a CPC, a CEC or a CHC.

The primary optics element expediently has reflective surfaces with convex curvature. This makes it possible not only to collimate a light beam but also to shape its cross-sectional contour and/or luminance distribution. At the same time, a primary optics element such as this makes it possible to achieve a highly efficient lighting means.

The cross-sectional area of the primary optics element increases continuously in its profile from the light inlet to the light outlet. Alternatively, the primary optics element is composed of sections whose cross-sectional area increases continuously in the profile to the light outlet, and of sections with a constant cross-sectional area. Once again, this makes it possible to improve the emission efficiency.

BRIEF DESCRIPTION OF THE DRAWINGS

FIG. 7 shows a schematic illustration of a second exemplary embodiment of the lighting means.

FIG. 8 shows a schematic illustration of a third exemplary embodiment of the lighting means.

FIG. 9 shows a schematic illustration of a second exemplary embodiment of the primary optics element.

FIG. 10 shows a schematic section view of the primary optics element illustrated in FIG. 9.

FIG. 20 shows a schematic perspective illustration of a seventh primary optics element with and without a light source.

FIGS. 23 and 24 are tables respectively containing coordinates of surface points of the primary optics element shown in FIGS. 21 and 22.

DETAILED DESCRIPTION OF THE DRAWINGS

The elements illustrated in the figures should not necessarily be regarded as being to scale, and in fact, in some cases, they are illustrated in an exaggeratedly enlarged form in order to assist understanding. Identical elements or elements having the same effect are provided with the same reference symbols in the figures.

Figure 1:
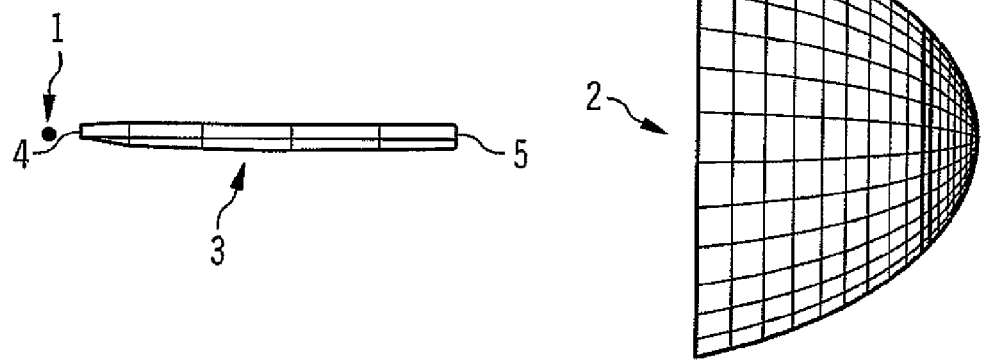
FIG. 1 shows a schematic illustration of a first exemplary embodiment of the lighting means as a wire grid model.
Figure 2:
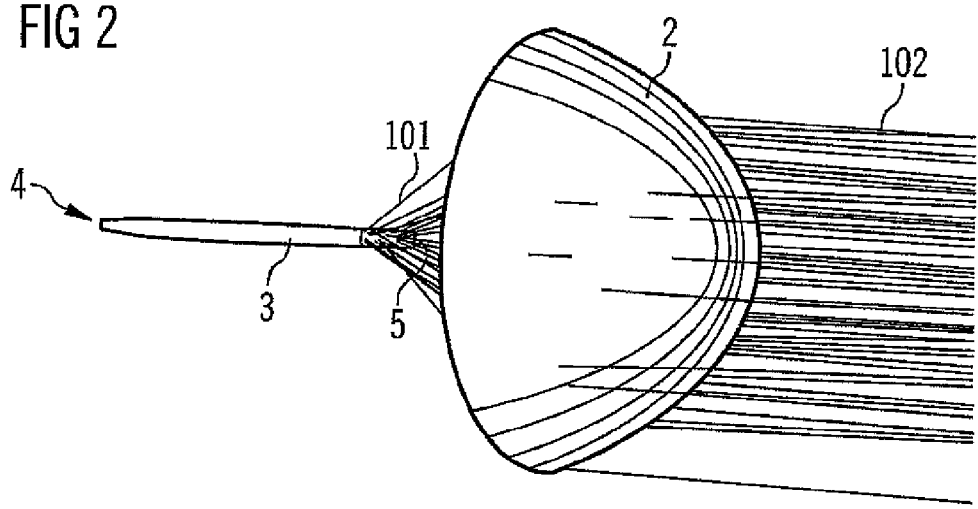
FIG. 2 shows a first perspective illustration of the lighting means illustrated in FIG. 1.
Figure 3:
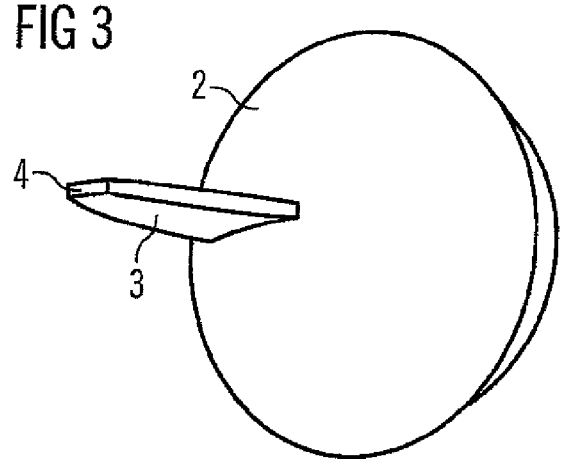
FIG. 3 shows a second perspective illustration of the lighting means illustrated in FIG. 1.

The exemplary embodiment of the lighting means having a predetermined emission characteristic, as illustrated in FIGS. 1 to 3, has a light source 1 and an optical apparatus 2 arranged downstream from it in the form of a lens. A primary optics element 3a, in the form of a specially shaped CPC (compound parabolic concentrator) and with a light inlet surface 4a and a light outlet surface 5a is arranged between the light source 1 and the lens. By virtue of its light-conducting functions, the primary optics element 3a can be used as an optical waveguide, with the characteristics and the influence on light that enters it going considerably beyond the functionality of an optical waveguide. An emission characteristic which corresponds to the predetermined emission characteristic is achieved by projection of the light outlet surface 5a by means of the optical apparatus 2.

The optical apparatus 2 converts the illumination intensity distribution, for example of the light outlet 5a, to a direction distribution or emission characteristic.

For illustrative purposes, FIG. 2 illustrates a family of light beams, determined using a ray-tracing method. Rays 101 exit primary optics element 3a through its light outlet surface 5a. Rays 101 are collimated by optical apparatus 2, such that outgoing rays 102 are emitted from optical apparatus 2 in the form of a substantially collimated beam of rays.

FIG. 3 shows another perspective view of primary optics element 3a and optical apparatus 2. FIG. 3 depicts the light inlet surface 4a of the primary optics element 3a, and the light inlet side of optical apparatus 2 can be seen as well.

An LED or an array of a plurality of LEDs is preferably used as the light source 1.

In this case, it is particularly preferable to use white-light LEDs. LEDs such as these contain, for example, a semiconductor chip which emits in the blue spectral range and is followed by a luminescence conversion element. The luminescence conversion element converts some of the light produced by the semiconductor body to light at a different wavelength, for example in the yellow-orange spectral range, in order to produce the impression of white light, overall. With regard to a homogeneous colour impression, it is advantageous for the luminescence conversion element to be applied like a layer, for example in the form of a fluorescent layer, to the semiconductor body.

In fact, the fluorescent surface of the semiconductor chip itself is imaged when an LED such as this is projected. This makes it harder to achieve the brightness profiles, so that an additional diffuser is conventionally required, in general, for this purpose.

In the case of the present invention, on the other hand, the light which is produced by the semiconductor body and the luminescence conversion element is gathered, mixed, made directional and emitted again in the optical waveguide, for example the specially shaped CPC. There is no need for a separate diffuser.

Area emitters, such as thin-film light-emitting diode chips, are particularly suitable for use as the light-emitting diode.

A thin-film light-emitting diode chip is distinguished in particular by the following characteristic features:

a reflective layer is applied to or formed on a first main surface (which faces towards a mount element) of a radiation-producing epitaxial layer sequence and reflects back at least a portion of the electromagnetic radiation produced in the epitaxial layer sequence into that layer sequence;

the epitaxial layer sequence has a thickness in the region of 20 µm or less, in particular in the region of 10 µm; and the epitaxial layer sequence contains at least one semiconductor layer with at least one surface which has a mixing structure which, in the ideal case, leads to approximately ergodic distribution of the light in the epitaxial layer sequence, that is to say it has a scattering behaviour which is as ergodically stochastic as possible.

A fundamental principle of a thin-film light-emitting diode is described, for example, in I. Schnitzer et al., Appl. Phys. Lett. 63 (16), 18 Oct. 1993, 2174-2176, the disclosure content of which is hereby incorporated by reference.

To a good approximation, a thin-film light-emitting diode chip is a Lambert surface emitter, and is thus particularly highly suitable for use in the lighting means, in particular for a headlight.

In a further variant of the invention, an LED with a plurality of semiconductor bodies which, for example, emit in the red, green and blue spectral bands, can be used as the LED. White light can likewise be produced by LEDs such as these by appropriate driving of the semiconductor chip, in each case with it once again being advantageous for the light emitted from the various semiconductor bodies to mixed.

In a further variant of white-light LEDs, the luminescence conversion element is in the form of an encapsulation compound which envelopes the semiconductor body, for example in the form of potting, in which appropriate fluorescent particles are distributed. By way of example, a reaction resin, such as an epoxy resin or—as is preferable owing to its higher radiation stability—a silicone resin, is suitable for use as the moulding compound. This variant admittedly in principle results in a less homogeneous colour impression owing to the different path lengths of the radiation produced in the moulding compound. However, this colour inhomogeneity is advantageously compensated for by the mixing of the radiation in the optical waveguide.

The light outlet surface 5a of the optical waveguide is shaped in accordance with the predetermined emission characteristic, in which case sharp light/dark transitions can be achieved by the respective choice of the external contour without any need for a shutter. In a corresponding manner, the present invention relates in particular to a lighting means with a predetermined emission characteristic, which has no shutter.

Figure 4:
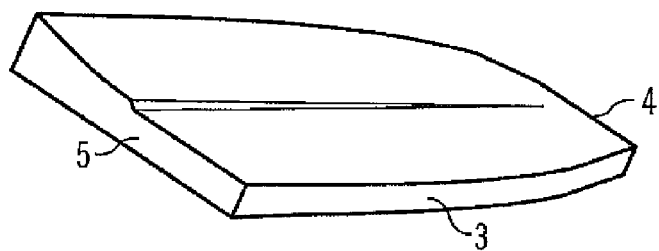
FIG. 4 shows a first perspective illustration of another exemplary embodiment of a primary optics element.
Figure 5:
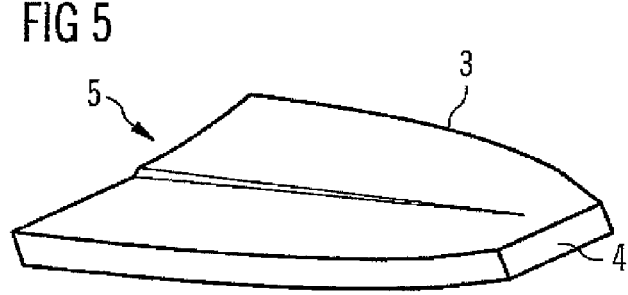
FIG. 5 shows a second perspective illustration of the primary optics element illustrated in FIG. 4.

In principle, the shape of the light outlet surface 5a can be determined by backimaging of the predetermined emission characteristic by the optical apparatus 2 onto the plane of the light outlet surface 5a. The light inlet surface 4a is, in contrast, matched in terms of the optimum light input to the light source such as the LED or the LEDs of the type mentioned above. FIGS. 4 and 5 illustrate a perspective detailed view of an optical waveguide in the form of a specially shaped CPC for a motor vehicle front headlight.

The primary optics element illustrated in FIGS. 4 and 5 is in the form of a non-imaging concentrator. However, the concentrator-like primary optics element 3b is not intended for normal use of a concentrator. In fact, the radiation passes through the primary optics element 3b in the opposite direction to that in which it passes through a concentrator when used in the normal manner. The light inlet surface 4b correspondingly preferably has a smaller cross-sectional area than that of the light outlet surface 5*b* of the primary optics element 3*b*.

The primary optics element 3*b* is in the form of a dielectric concentrator, whose base body is a solid body composed of a dielectric material with a suitable refractive index. The light inlet surface 4*b* is in the form of a light inlet surface, and the light outlet surface 5*b* is in the form of a light outlet surface of the base body. The light inlet surface 4*b* and the light outlet surface 5*b* are connected to one another via side surfaces of the primary optics element 3*b*, on which light is deflected by means of total internal reflection.

At least the light outlet of the primary optics element 3*b* has a long shape, that is to say its cross section has a main extent and a shortest extent, or a length and a width, with the length being greater than the width. The side surfaces of the primary optics element 3*b* are curved, with the side surfaces which connect the breadth faces of the light outlet surface 5*b* to the light inlet having greater curvature than the side surfaces which connect the longitudinal faces of the light outlet surface 5*b* to the light input surface 4*b*. The side surfaces are freeform surfaces, whose shape is optimized so that it is possible to produce an intended emission characteristic by deliberate reflections on these side surfaces in the primary optics element 3*b*.

Detailed information is provided about, for example, the kind of light source that is used, the shape and the position of the light inlet and the light outlet of the primary optics element, that the primary optics element is preferably designed in the manner of a non-imaging concentrator and particularly preferably in the manner of a CPC-like concentrator, and the form and the light intensity distribution of the light beam that is to be emitted. A person with ordinary skill in the art who is provided with such information can readily perform the required optimization.

A number of different numerical simulation and optimization methods can be used in order to obtain suitable forms of the free form surfaces described herein. Such optimization methods are well known to a person with ordinary skill in the art.

As a starting point for optimizing the shape of the free form surfaces, predetermined parameters are chosen. These parameters are, for example, the form and the position of the light inlet surface, the form and the position of the light outlet surface, and the height of the primary optics elements (i.e. the distance between the light inlet and the light outlet). Also, at least one, preferably two or more supporting points which are defined to be positioned on the free form surface are chosen. In order to choose such supporting points, one can align the choice to concentrator-like and/or CPC-like shapes, as described herein. Further predetermined parameters are the light emission characteristics and the position of the light source as well as the demanded properties of the light beam exiting the light outlet of the primary optics element. Possible features of the emitted light beam such as its shape or light intensity distribution are described herein.

Having chosen such predetermined parameters one can use various well-known numerical techniques in order to calculate suitable free form faces which fulfill the predetermined optical characteristics of the primary optics element.

For example, it is possible to use grid methods in order to optimize the shape of the free form surfaces. Grid methods work fine with small predetermined values and if a small number of supporting points is chosen. However, if there are too many predetermined parameters, grid methods quickly become very complex such that computing possible solutions becomes very time-consuming.

In addition or as an alternative to grid methods, genetic algorithms can be used. A genetic algorithm functions by generating a large set of possible solutions to a given problem. It then evaluates each of those solutions and decides on a "fitness level" for each solution set. These solutions then breed new solutions. The parent solutions that were more "fit" are more likely to reproduce, while those that were less "fit" are less likely to do so. This way the shape of the free form surfaces of the primary optics element can be iteratively optimized.

Another possible technique for optimization is the so-called "move-class deflation". Yet another possible technique is the use of randomizing methods. All these techniques are well established numerical methods that are well known to a person with ordinary skill in the art.

It is also possible to combine several of the above-described techniques in order to optimize the shape of the primary optics element. For example, genetic algorithms are combined with move-class deflation. In addition, randomizing methods can be used in order to make sure that an optimum solution that is found using a combination of the other methods is not only a "local maximum" with an absolute maximum solution lying somewhere else. In this way, randomizing methods are used to check if the solutions found by, for example, genetic algorithms and/or move-class deflation hold. Using such a technique that combines several numerical methods with each other, the shape of the primary optics shown in the figures of the application were modeled. Since this optimization process is iterative, it is not possible to present something like an absolute formula. Instead, one approach of the present invention is to optimize the primary optics element with regard to the properties described and on the basis of the given predetermined values mentioned above.

Figure 22:
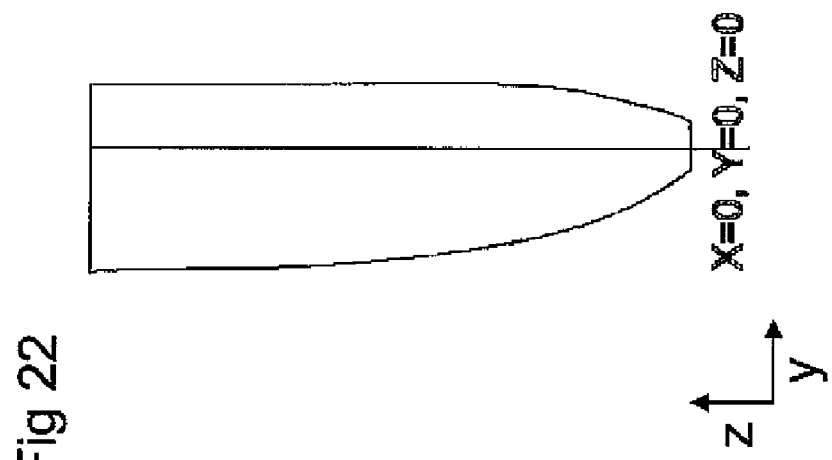
FIG. 22 shows the primary optics element in a perspective view in x-direction.
Figure 21:
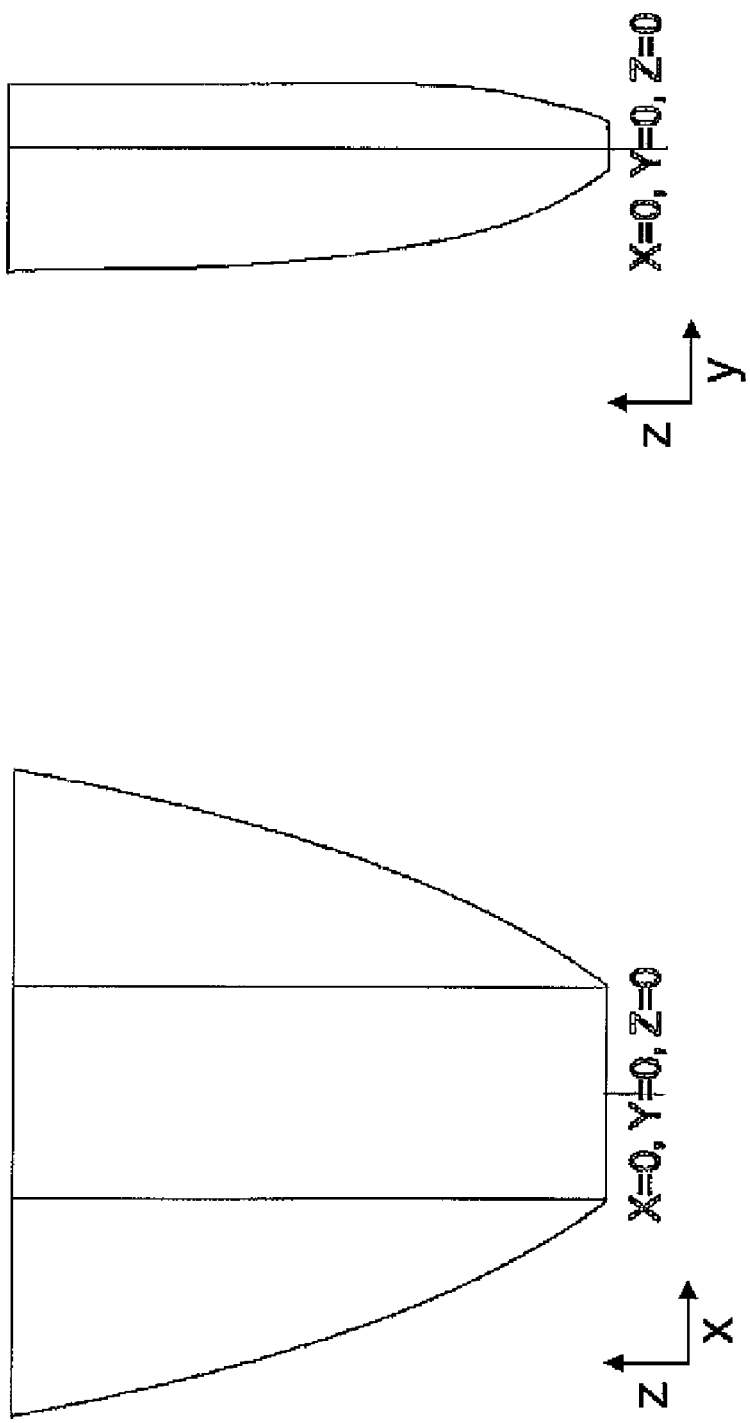
FIG. 21 shows the primary optics element in a perspective view in y-direction.

FIG. 21 shows the primary optics element in a perspective view in y-direction. FIG. 22 shows the primary optics element in a perspective view in x-direction.

FIGS. 23 and 24 are tables respectively containing coordinates of surface points of the primary optics elements shown in FIGS. 21 and 22.

In particular, the side surfaces are shaped such that light that enters is not only mixed but is also collimated by internal reflections, so that a light image entering the light inlet surface 4*m* is not imaged at the light output surface 5*m*, and such that the light that enters has less divergence on the light inlet side as a result of the internal reflections on the light outlet side.

Furthermore, the light is preferably deflected, for example in the primary optics element, by the deliberate reflections onto a limited area of the light outlet, thus resulting in an inhomogeneous luminance distribution with a so-called hotspot. This hotspot is located in the vicinity of one of the longitudinal faces at the light outlet surface 5*m*.

In the primary optics element illustrated in FIGS. 4 and 5, this longitudinal face has two essentially linear subsections, whose main extent directions are inclined with respect to one another such that they include an angle of about 165° on the outer face of the light outlet. A primary optics element 3*b* such as this is particularly suitable for a headlight lighting means for a motor vehicle. The emission characteristic of a headlight for a motor vehicle is predetermined and is designed such that the roadway in the direction of travel is illuminated most brightly, and the light beam has a reduced light intensity toward the outside in both directions, that is to say on the one hand on the side of approaching vehicles and on the other hand on the side of the edge of the road.

In order to avoid dazzling the drivers of oncoming vehicles, it is also advantageous for the upper edge of the light beam to run essentially horizontally on this side, and to have a sharp light/dark transition. In contrast, an upper edge of the light beam which runs obliquely with respect to the horizontal, for example at an angle of about 15°, is specified for the side of the road facing away from the oncoming traffic. Specifications such as these can be complied with particularly well by a primary optics element, as has already been explained with reference to FIGS. 4 and 5, and by a lighting means, as has been explained already with reference to FIGS. 1 to 3. At the same time, this allows efficient use of light entering the light inlet surface 4b of the primary optics element 3b.

Figure 6:
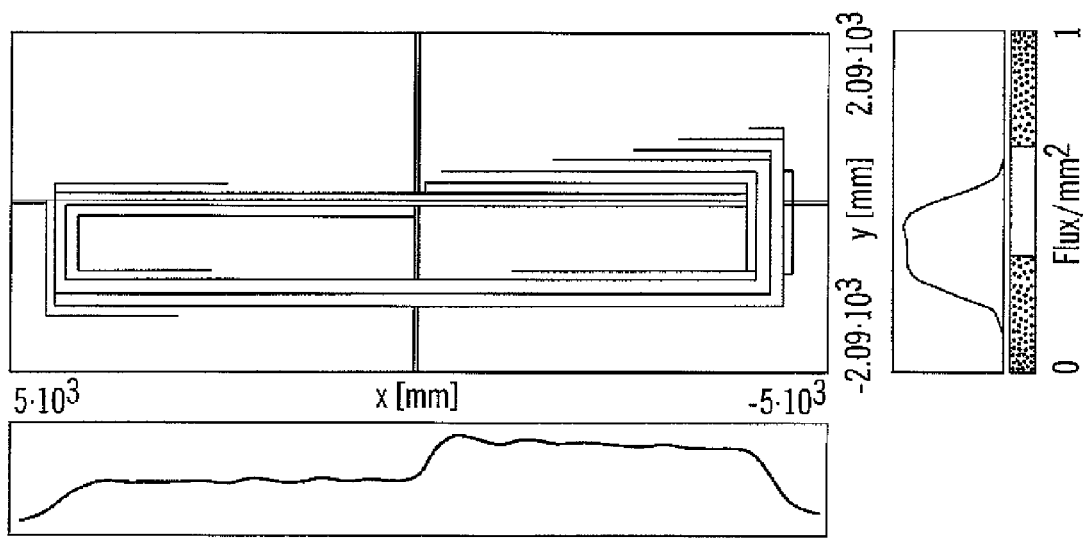
FIG. 6 shows an illumination intensity image of a detector which is illuminated by the lighting means, as illustrated in FIG. 1, using the primary optics element as illustrated in FIGS. 4 and 5.

FIG. 6 shows an illumination intensity image of a detector at a distance of 25 m from a lighting means as explained above with reference to FIGS. 1 to 5.

The illustration extends from −5000 mm to 5000 mm in the x direction, and from about −2000 mm to 2000 mm in the y direction. The figure likewise shows the light flux along the axes that are shown. The sharp light/dark transitions which can be achieved by the present invention without a shutter should be emphasized. Furthermore, the illumination intensity image clearly shows that the luminance distribution has a brightest area, a hotspot, in the centre of the cross section of the light beam, see the maximum at about 500 m in the x direction. The governing factor for the production of an illumination intensity image such as this with the lighting means is on the one hand the specific configuration and shape of the primary optics element (3a, 3b), in particular of its reflective surfaces, and the deliberate projection of the light image produced by the primary optics element (3a, 3b) by means of the optical apparatus 2. In this case, either the light outlet or an imaginary surface which is arranged in the beam path and in particular between the light outlet and the optical apparatus 2 can be projected by means of the optical apparatus.

In the case of the lighting means 6 illustrated in FIG. 7, the light outlet surface 5c has an essentially rectangular cross section, whose corners are rounded. The rounding of the corners allows the brightness profile of the light/dark transition of the light beam to be emitted to be somewhat blurred.

While, on the one hand, it is desirable to have a light/dark transition that is as abrupt as possible on one longitudinal face and on the upper edge of the light beam, this light/dark transition should on the other hand not be excessively sharp, since this may have a disturbing effect, particularly for headlight lighting means for motor vehicles.

Since the primary optics element 3c allows particularly sharp light/dark transitions to be achieved by virtue of its shape and its configuration of the side surfaces 34c with efficient use of the light entering it, it may be advantageous to adopt additional measures for blurring or weakening these transitions without any significant losses in terms of the emitted radiation intensity spatial angle.

Additionally or as an alternative to rounding of at least one corner of a light outlet surface 5c with an essentially angled cross section, the optical apparatus 2 may be designed such that the light/dark transitions are slightly blurred. For example, the optical apparatus may be in the form of a projection lens whose focus area lies on an imaginary curved surface.

An internal area of the focus area is located, for example, on a main extent plane of the light outlet surface 5c, while outer areas of the focus area are located on imaginary surface elements which are curved away from the main extent plane of the light outlet surface 5c. For this purpose, the optical apparatus 2 is a freeform lens in the form of a projection lens. This makes it possible for the contour of the light outlet to be located outside the focus range of the projection lens, thus making it possible to effectively design an optimum profile of the light/dark transition of an emitted light beam in accordance with a predetermined emission characteristic. These measures for adjustment of the light/dark transition can be applied to all primary optics elements and all lighting means according to the invention.

In contrast to the lighting means that has been explained above with reference to FIG. 7, the lighting means 6 illustrated in FIG. 8 has an optical deflection element 10 which is arranged in the beam path between the light source 1 and the primary optics element 3d. A deflection element 10 such as this makes it possible to arrange or to orient the light source independently of the main emission direction of the primary optics element 3d. For example, the light source 1 can be aligned with respect to the primary optics element 3d in such a way that its main emission direction runs essentially at right angles to that of the primary optics element.

The deflection element 10 may be in the form of a dielectric solid body with reflective external surfaces, or else in the form of a hollow body with reflective internal surfaces. Its light inlet is preferably matched to the light source, and its light outlet surface 5d is connected to the light inlet surface 4d of the primary optics element 3d, preferably with a matched cross section and without any gaps.

The primary optics element 3e illustrated in FIGS. 9 and 10 has a base body which defines a cavity 32. The internal walls of the base body which bound the cavity are reflective. In the case of a primary optics element 3e such as this with a cavity 32 and reflective internal walls 33, the light source may be arranged partially or entirely within the primary optics element. Alternatively, the primary optics element 3e is continued on the side of the light inlet surface 4e into a frame (not shown) which surrounds the light source.

In a further alternative, the primary optics element may be in the form of a dielectric element on whose boundary surfaces total internal reflection takes place, owing to a sudden change in the refractive index. Dielectric primary optics elements such as these have a better output efficiency than a primary optics element with a cavity, since less light is absorbed within the primary optics element because of the total internal reflection with a reflectivity of up to 100%.

The light inlet surface 4e has a long shape and is, for example, provided for a plurality of light-emitting diode chips which are arranged along a straight line and, for example, have a square radiation outlet surface. Alternatively, the cross section of the light inlet surface 4e may also not be long, but for example may be in the form of a type of square with or without rounded edges. The light inlet may likewise have a circular cross section or, in general, a cross section with four-stage symmetry, for example in the form of a polygon with an even number of sides.

The light outlet surface 5e has an elongated cross section with a first longitudinal face 51e, a second longitudinal face 52e and two breadth faces which connect the two longitudinal faces to one another. The first longitudinal face 51e is closer to the light inlet surface 4e than the opposite second longitudinal face 52e, as can be seen in the schematic section view shown in FIG. 10. The distance 53e between the first longitudinal face 51e and a projection of the light inlet surface 4e onto a main extent plane of the light outlet surface 5e is shorter than the distance 54e between the second longitudinal face 51e and this projection of the light inlet surface 4e.

The reflective surfaces 33 of the primary optics element 3e, which connect the two longitudinal faces 51e, 52e to the light inlet surface 4e, both have convex curvature. The side surface 331 which connects the first longitudinal face 51e to the light inlet surface 4e has a steeper profile with respect to a main extent direction 30 of the primary optics element 3e than the opposite section 332 of the side surfaces, which connect the second longitudinal face 52e to the light inlet surface 4e. Those side faces 333, 334 which connect the breadth faces 510, 520 of the light outlet surface 5e to the light inlet surface 4e likewise have convex curvature. This curvature is, for example, more pronounced than the curvature of the other side walls.

The primary optics element 3e illustrated in FIGS. 9 and 10 can advantageously be used to produce an inhomogeneous luminance distribution on the side of the light outlet surface 5e. This inhomogeneous luminance distribution has, in particular, at least one brightest area in the vicinity of the first longitudinal face 51e. The primary optics element is thus likewise particularly suitable for headlight lighting means in motor vehicles.

In addition to an image of a predetermined luminance distribution at the light outlet or on an imaginary surface arranged downstream of the light outlet in the emission direction, light which enters the primary optics element 3e is mixed and collimated in it.

It has been found that the beam shaping to a light beam with a predetermined shape and luminance distribution is particularly effective when the first longitudinal face 51e of the light outlet surface 5e is at a distance 53e from the projection of the light inlet surface 4e at the light outlet surface 5e (indicated by the dashed lines in FIG. 10) and when this distance 53e is shorter than the distance 54e between the second longitudinal face 52e and the projection of the light inlet surface 4e. In other words, the light inlet surface 4e is shifted toward the first longitudinal face 51e, when viewed in a plan view of the light outlet surface 5e.

An arrangement of the light outlet surface 5e and light inlet surface 4e such as this with respect to one another makes it possible to optimally design those side surfaces which connect the light inlet surface 4e to the light outlet surface 5e in terms of achieving a luminance density which is as high as possible, collimation that is as good as possible, the imaging of a desired luminance distribution, and/or the formation of an intended cross section of a light beam. The side surfaces are, in particular, freeform surfaces, whose shape has been individually optimized with respect to some or all of the parameters mentioned above.

In addition to the shape of the side surfaces, the distance between the light inlet surface 4e and the light outlet surface 5e and the length of the primary optics element 3e are also important. The greater this distance, or the longer the primary optics element 3e, the better is the mixing and/or the degree of collimation which can be achieved by the primary optics element 3e. In contrast, primary optics elements with a short length are advantageously very compact.

By way of example, the primary optics element illustrated in FIGS. 9 and 10 has a length which is at least twice the width of the light inlet surface 4e, and is at most 20 times the width of the light inlet surface 4e. The length, that is to say the distance between the light inlet surface 4e and the light outlet surface 5e, is, for example, at least 3 mm, preferably at least 5 mm, and at most 15 mm.

Figure 11:
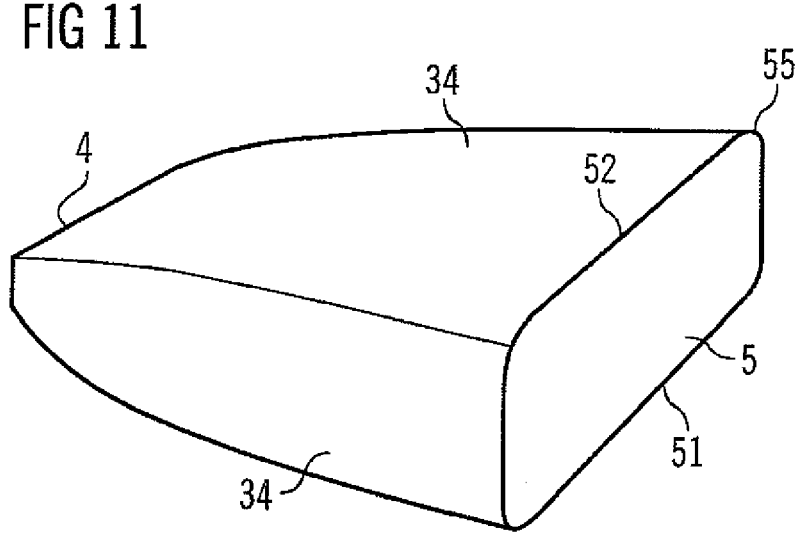
FIG. 11 shows a schematic illustration of a third exemplary embodiment of the primary optics element.
Figure 12:
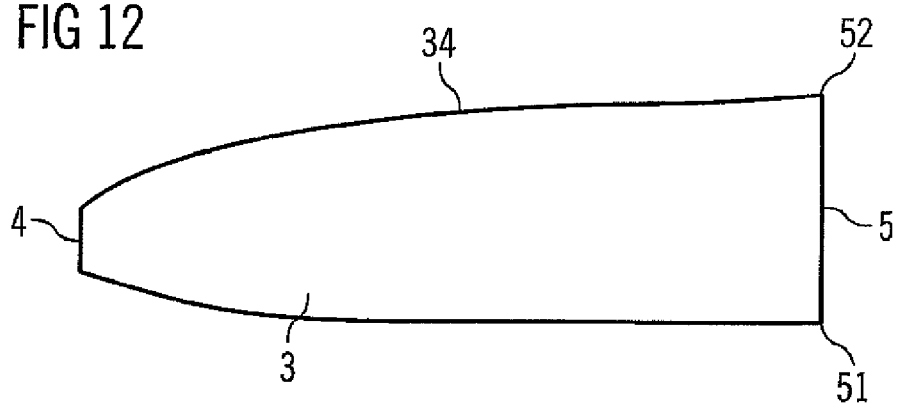
FIG. 12 shows a schematic section view of the primary optics element illustrated in FIG. 11.
Figure 13:
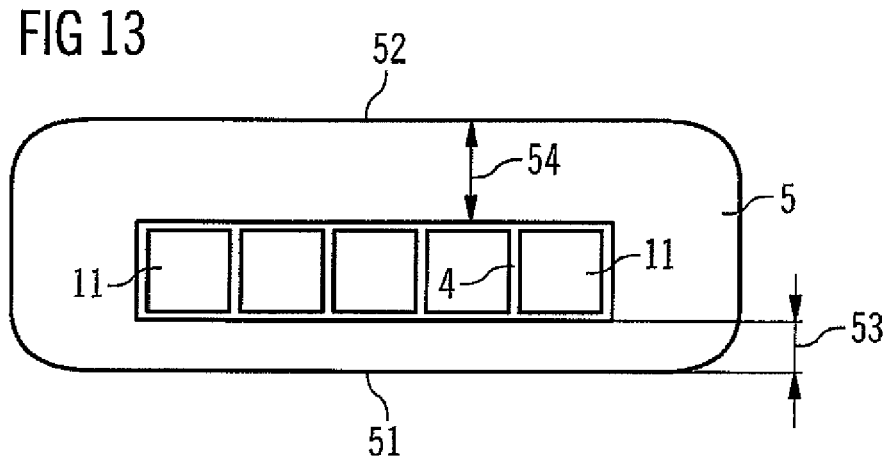
FIG. 13 shows a schematic plan view of the light inlet of the primary optics element illustrated in FIGS. 11 and 12.

In contrast, the primary optics element illustrated in FIGS. 11 to 13 has a length which is at least five times the width of the light inlet surface 4f, preferably at least ten times the width of the light inlet surface 4f, and particularly preferably fifteen times the width of the light inlet surface 4f. By way of example, the primary optics element has a length of greater than or equal to twenty times the width of the light inlet surface 4f. The length is, for example, at least 10 mm, preferably at least 15 mm, or greater than or equal to 20 mm.

Both the primary optics element illustrated in FIGS. 9 and 10 and that illustrated in FIGS. 11 to 13 have a light outlet surface 5e, 5f, respectively whose cross section is in the form of a rectangle, with the corners of the rectangle being rounded. As already mentioned above, this makes it possible to weaken the sharp light/dark transition of a light beam to be emitted. The profile and in particular the length of the light/dark transition can be adjusted by means of this measure. Not only the cross section of the light outlet surface 5e, 5f but also the cross section of at least one section of the primary optics element 3e, 3f preferably have rounded edges in the vicinity of the light outlet surface 5e, 5f.

As can be seen in FIGS. 12 and, in particular, 13, a first longitudinal face 51f of the light outlet surface 5f is closer to the light inlet surface 4f than opposite second longitudinal face 52f of the light outlet surface 5f. Both the first longitudinal face 51f and the second longitudinal face 52f are at a lateral distance from the longitudinal faces of the light inlet surface 4f, that is to say the longitudinal faces 51f, 52f of the light outlet are at a distance from the longitudinal faces of the light inlet surface 4f, seen in a plan view of the light outlet surface 5f (see FIG. 13). In this case, the lateral distance 53f of the first longitudinal face 51f is shorter than the lateral distance 54f of the second longitudinal face 52f of the light outlet surface 4f.

The longitudinal faces of the light inlet surface 4f are those whose main extent direction runs essentially parallel to the longitudinal faces 52f, 51f of the light outlet surface 5f. The other faces of the light inlet surface 4f are its breadth faces. These terms apply in the present case even when the breadth faces of the light inlet are of the same length or are longer than its longitudinal faces.

The light inlet is intended for a plurality of light-emitting diodes 11, which are arranged in the form of a line. The line preferably has a straight profile. The shape of the line may, however, also have curves or corners. However, the line has a prolate form.

The main conductor chips are for this purpose particularly preferably arranged in a single row. However, they can also be arranged in a plurality of rows, for example in two rows, provided that the semiconductor chip is arranged linearly overall. The plurality of rows together produces the shape of the line in a situation such as this.

By way of example, the primary optics element is intended for at least three, and preferably for at least five, light-emitting diodes 11. By way of example, a lighting means with a primary optics element 3f has at most 20 or 30 light-emitting diode chips.

The light inlet surface 4f is matched to the size of the light-emitting diode chips 11 and has a width which is approximately of the same size as or is slightly larger than the corresponding extent of the light-emitting diode chips 11. The width of the light inlet, that is to say the width of the light inlet surface or of the light inlet opening, is preferably less than or equal to 1.5 times the size of the corresponding natural extent of the light-emitting diodes 11, with the lateral extent of the light-emitting diodes being measured along the width of the light inlet surface or light inlet opening. The width of the light inlet is preferably less than or equal to 1.25 times the size of the lateral extent of the light-emitting diode chips 11. By way of example, the width of the light inlet surface 4f is less than or equal to 1.1 times the corresponding lateral extent of the light-emitting diode chips 11.

In a lighting means with a primary optics element 3f such as this, the light-emitting diode chips are arranged as close as possible to the light inlet surface 4f. By way of example, none of them have their own light-emitting diode housings, but their luminous bodies, for example their semiconductor bodies, are arranged at a short distance from one another of, for example, less than or equal to 100 μm. Semiconductor light-emitting diodes, for example based on AlInGaN, are used as the lighting means. However, additionally or alternatively, it is also possible to use organic light-emitting diodes (OLEDs). Particularly in the case of organic light-emitting diodes, it is possible for a single light-emitting diode to be in a linear form, that is to say for the light output surface of the light-emitting diodes to be linear, and preferably to be extended.

The primary optics elements $3e$, $3f$ described above with reference to FIGS. 9 to 13 both have a cross section whose profile does not become smaller from the light inlet surface $4e$, $4f$ to the light outlet surface $5e$, $5f$. In these primary optics elements, the cross-sectional area preferably becomes continuously larger. However, the primary optics element may also have sections in which the cross-sectional area is constant. In general, it is possible for the cross-sectional shape to change without the cross-sectional area changing.

Figure 14:
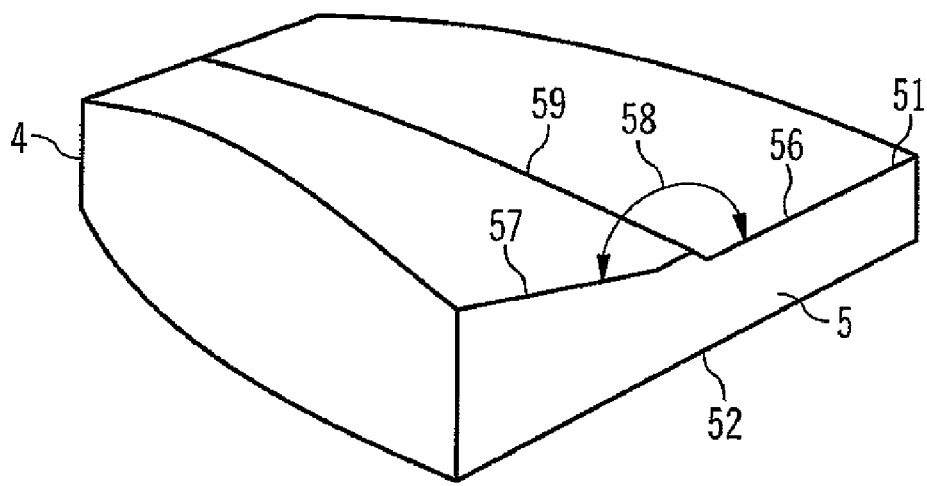
FIG. 14 shows a schematic illustration of a fourth exemplary embodiment of the primary optics element.
Figure 15:
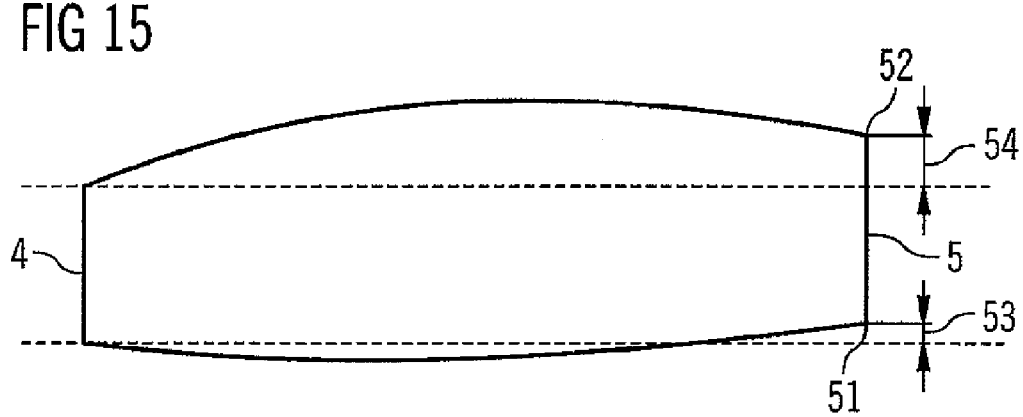
FIG. 15 shows a schematic section view of the primary optics element illustrated in FIG. 14.

In the case of the primary optics elements $3g$, $3h$ illustrated in FIGS. 14 and 15 as well as 16 to 18, there are sections in the profile from the light inlet surface $4g$, $4h$ to the light outlet surface $5g$, $5h$ in which the cross-sectional area becomes smaller. In this case, the cross-sectional area preferably passes through a maximum and becomes smaller from then on in the direction of the light outlet.

In these embodiments as well, both the side surfaces which connect the first longitudinal face $51g$, $51h$ of the light outlet surface $5g$, $5h$ to the light inlet and the side surfaces which connect the second longitudinal face $52g$, $52h$ of the light outlet surface $5g$, $5h$ to the light inlet surface $5g$, $5h$ are particularly preferably curved. They are particularly preferably in the form of freeform surfaces and are optimized for the production of a light beam with predetermined characteristics. The predetermined characteristics include, for example, very high divergence, luminance intensity distribution, a light beam shape and a light/dark transition which is as sharp as possible along at least one longitudinal face of the light beam.

In particular, an inhomogeneous luminance distribution, which preferably has a single brightest area or a plurality of very bright areas arranged alongside one another, can be achieved by internal reflections on the specially shaped side surfaces.

Figure 16:
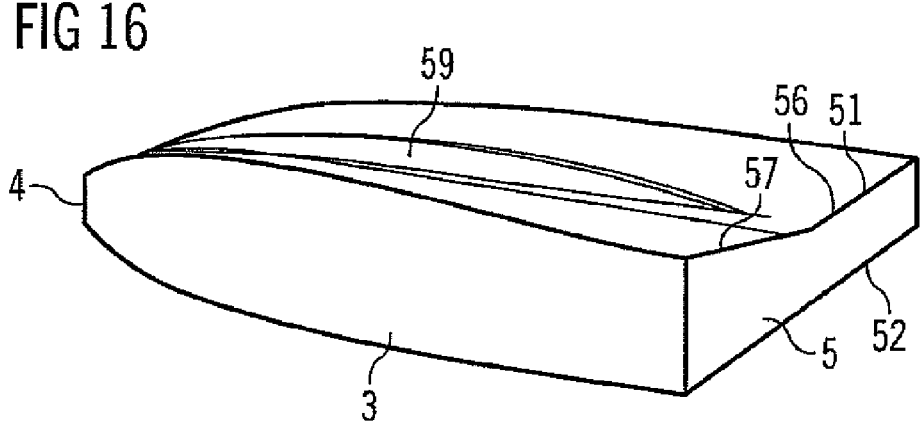
FIG. 16 shows a schematic illustration of a fifth primary optics element.
Figure 17:
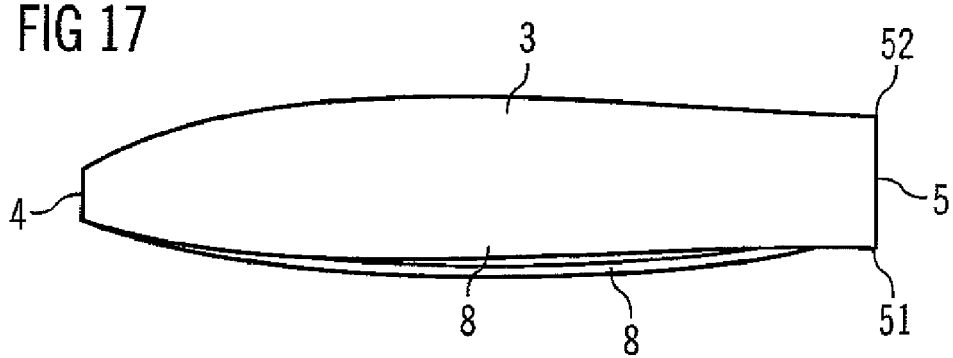
FIG. 17 shows a schematic section view of the primary optics element illustrated in FIG. 16.
Figure 18:
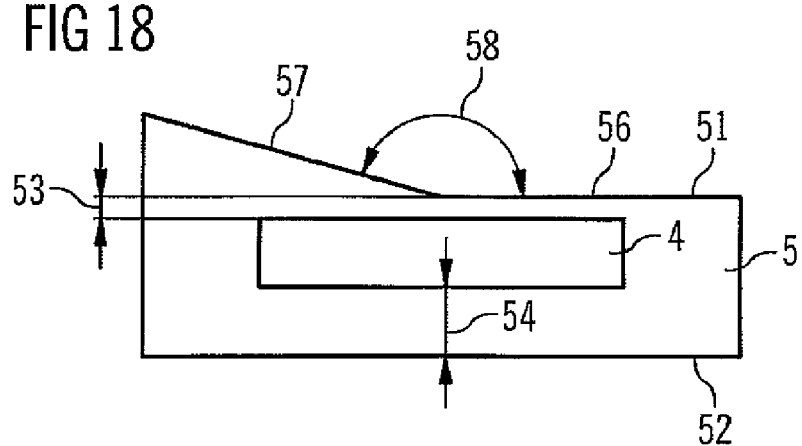
FIG. 18 shows a schematic plan view of the light outlet of the primary optics element illustrated in FIGS. 16 and 17.

In the primary optics element shown in FIGS. 14, 15, and the one shown in FIGS. 16-18, the light outlet surface $5g$, $5h$ has a long shape, with a first longitudinal face $51g$, $51h$ and a second longitudinal face $52g$, $52h$. The first longitudinal face $51g$, $51h$ has a first subsection $56g$, $56h$ and a second subsection $57g$, $57h$, whose main extent of directions are inclined with respect to one another such that they include an angle $58g$, $58h$ of greater than or equal to 160° and less than or equal to 170° on one outer face of the light outlet surface $5g$, $5h$. By way of example, this angle $58g$, $58h$ is about 165°. The subsections $56g$, $56h$, $57g$, $57h$ are preferably each designed to be straight, but may also have a profile which is curved in places or completely.

The maximum emission angle in the case of the primary optics elements described in the exemplary embodiments is asymmetric.

In the case of the primary optics element $3g$ illustrated in FIGS. 14 and 15, the light outlet surface $5g$ is shifted laterally with respect to the light outlet surface $4a$ such that the first longitudinal face $51g$ of the light outlet surface $5g$ runs laterally within the area of the light inlet surface $4g$. In other words, seen in a plan view of the light outlet surface $5g$, the first longitudinal face $51g$ is arranged partially within the light inlet surface $4g$. See FIG. 15.

Both the first longitudinal face $51g$ and the second longitudinal face $52g$ are separated by a distance $53g$, $54g$ from the breadth faces of the light inlet surface $4g$. The lateral distance $53g$ between the first longitudinal face $51g$ of the light outlet surface $5g$ and the closest breadth face of the light inlet surface $4g$ is preferably less than the lateral distance $54g$ between the second longitudinal face and the closest breadth face of the light inlet surface $4g$.

The cross section of the light outlet surface $5g$ has a shape with a plurality of corners. These corners may also be partially or completely rounded in order to adjust the profile of a light/dark transition for a light beam to be emitted. This likewise applies to the primary optics element $3h$ illustrated in FIGS. 16 to 18 and to all other primary optics elements whose cross section of the light outlet surface $5h$ has corners.

The shape of the primary optics element $3h$, which bulges in a longitudinal section, and the lateral arrangement of the light inlet surface $4h$ and the light outlet surface $5h$ with respect to one another make it possible to produce, particularly well, a light beam with an inhomogeneous luminance distribution and a predetermined cross section with sharp light/dark transitions.

The light outlets surface $5h$ of the primary optics elements $3h$ have a changing width, so that one half of the light outlet surface $5h$ has a larger cross-sectional area than the other, with the halves being separated by an imaginary line running at right angles to the second longitudinal face $52h$.

In the case of the primary optics element illustrated in FIGS. 14 and 15, the side wall which connects the first longitudinal face $51g$ of the light outlet surface $5g$ to the light inlet surface $4g$ has an outward bulge $59g$ extending from the light inlet surface $4g$ to the light outlet. By way of example, the outward bulge $59g$ is formed angled. The outward bulge $59g$ is used to set an inhomogeneous luminance distribution which can be produced by means of the primary optics element $3g$. Light which is reflected in the area of this outward bulge $59g$ is provided with a preferred direction and, in particular, is deflected in the direction of an area for a hotspot to be produced in the luminance distribution.

The primary optics element $3h$ illustrated in FIGS. 16 to 18 likewise has an outward bulge $59h$, which is located on that side surface which connects the light input to the first longitudinal face $51h$ of the light outlet surface $5h$. By way of example, the outward bulge $59h$ has a rounded surface, although it may also have corners. It extends from the light inlet surface $4h$ in the direction of the light outlet surface $5h$, and forms a type of light channel on the outer wall of the primary optics element $3h$, by means of which light entering through the light inlet surface $4h$ can be provided with a preferred direction. This is advantageous for deliberate imaging of an inhomogeneous luminance distribution on the light outlet surface $5h$ or on an imaginary surface which partially overlaps the light outlet surface $5h$, or is arranged downstream from the light outlet surface $5h$ in the emission direction of the primary optics element $3h$.

By way of example, the outward bulge $59h$ extends over only a part of the length of the primary optics element $3h$, and does not, for example, extend as far as the light outlet surface $5h$.

The primary optics element $3h$ may have a second outward bulge in the form of a light channel (not shown) on one side of the side walls, which is opposite the first outward bulge. The light channels may, for example, be shaped in the form of an ellipsoid, which projects out of the base body of the primary optics element on one or two side surfaces, in the form of elongated outward bulges.

The first longitudinal face 51h is at a lateral distance 53h from the light inlet surface 4h which is shorter than the lateral distance 54h between the opposite second longitudinal face 52h and the light inlet surface 4h.

It may be advantageous for the primary optics element, for the lateral distance 53h between the first longitudinal face 51h and the light inlet to be at least 20%, preferably at least 30% and particularly preferably at least 50% shorter than the lateral distance 54h between the second longitudinal face 52h and the light inlet, see by way of example, FIG. 18.

Figure 19:
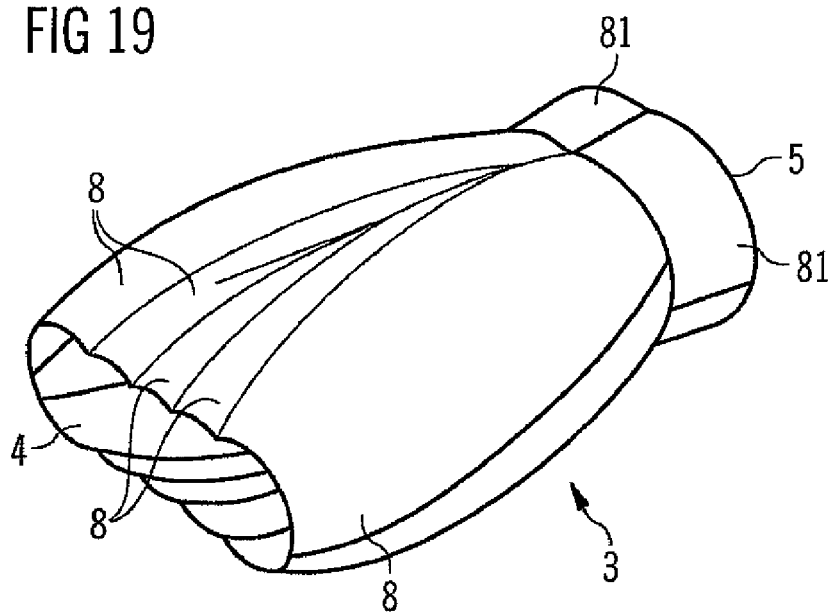
FIG. 19 shows a schematic illustration of a sixth primary optics element.

The primary optics element 3j illustrated in FIG. 19 has a light inlet surface 4j whose cross section has a greater length than the cross section of the light outlet surface 5j. Alternatively, however, the length of the cross section of the light outlet surface 5j may also be of the same size or greater than that of the cross section of the light inlet surface 4j.

In a section on the side of the light inlet surface 4j, the primary optics element has a plurality of light channels 8 which are arranged alongside one another and extend in the direction of the light outlet surface 5j, merge into one another at the side, and can be seen as a plurality of elongated outward bulges. Each of these light channels 8 has, for example, a separate associated light source, preferably a light-emitting diode chip. The primary optics element has, for example, between three and 20 light channels 8, inclusive, and preferably has at least five light channels 8.

In the profile from the light inlet surface 4j to the light outlet surface 5j, at least one of the light channels 8 merges into the other light channels. The light channels 8 preferably run together, so that there are fewer light channels 8 in the vicinity of the light outlet. By way of example, five light channels 8 open into a single light channel or into two light channels 81. Alternatively, all of the light channels 8 may also extend completely from the light inlet surface 4j to the light outlet surface 5j over the entire length of the primary optics element 3j.

The cross section of the light outlet surface 5j has a greater width than the cross section of the light inlet surface 4j. A primary optics element 3j with a plurality of light channels which merge into one another at the side is particularly advantageous for production of a desired emission characteristic, in particular of a light beam with a cross section which has an inhomogeneous luminance distribution, and with a cross-sectional shape which corresponds to a predetermined shape and has an abrupt light/dark transition.

The light channels 8 preferably have a round cross section, so that they result in a large number of round, elongated bulges. Alternatively or additionally, one or more of the light channels 8 may also have a cross section with corners.

The primary optics element illustrated in FIG. 19 has a section which is adjacent to the light outlet surface 5j and in which the cross-sectional area increases again toward the light outlet surface 5j after passing through a minimum, thus forming a funnel at the end of the primary optics element 3j.

The light channels are, for example, incorporated in the base body of the primary optics element 3j in the form of surface segments. Said surface segments comprise an elliptical or parabolic curvature or some other shape or curvature.

FIG. 20 illustrates how the primary optics element 3k can be mounted on a light source 1 and can be adjusted relative to it. For this purpose, the primary optics element has adjusting pins 39, which are fitted to extensions 38 which project away from the base body of the primary optics element 3k on the side of the light outlet surface 5k. The primary optics element 3k, the extensions 38 and the adjusting pins 39 are preferably formed integrally. However, they may also be assembled from two or more individual parts, for example by means of adhesive bonding or plug-connection. The light source 1 has holes for the adjusting pins 39, so that the primary optics element can be plugged on such that it fits accurately.

The explanation of the invention with reference to the exemplary embodiment should not be regarded as implying any restriction to this. In particular, the invention covers all combinations of the features mentioned in the exemplary embodiments and in the rest of the description, even if this combination is not the subject matter of a patent claim. The individual features described in the various exemplary embodiments can in principle also be combined with features of the other exemplary embodiments, and the exemplary embodiments themselves.

We claim:

1. A primary optics element in the form of a non-imaging concentrator which, compared with a normal use of a concentrator, allows radiation to pass through in an opposite direction, the primary optics element comprising a light inlet and a light outlet which, seen in a plan view, has a long shape with a first longitudinal face opposite to a second longitudinal face, the primary optics element having a cross section in the form of a polygon which has at least one rounded corner, on the light outlet side.

2. The primary optics element according to claim 1, wherein
the polygon forming a cross section of the primary optics element has at least four rounded corners, on the light outlet side.

3. The primary optics element according to claim 1, wherein the primary optics element comprises a base body, which defines a cavity comprising an internal wall that is reflective at least for a spectral subrange of visible electromagnetic radiation.

4. The primary optics element according to claim 1, wherein the primary optics element is a dielectric concentrator, and having a base body that is a solid body comprising a dielectric material with a refractive index such that light which is input via the light inlet is reflected by total internal reflection on side boundary surfaces of the solid body to a surrounding medium, the side boundary surfaces connecting the light inlet to the light outlet.

5. The primary optics element according to claim 1, wherein the primary optics element is configured to collimate light entering through the light inlet by means of internal reflections.

6. The primary optics element according to claim 1, wherein the primary optics element is configured to image light entering through the light inlet on the light outlet or on an imaginary surface which is arranged downstream from the light outlet in an emission direction of the primary optics element with a predetermined inhomogeneous luminance distribution.

7. The primary optics element according to claim 1, wherein the primary optics element is configured to mix light entering through the light inlet by means of internal reflections.

8. The primary optics element according to claim 1, wherein, in the vicinity of the light outlet, the primary optics element has a cross sectional shape in the form of a predetermined cross-sectional shape for a light beam to be emitted.

9. The primary optics element according to claim 1, wherein the cross-sectional shape is asymmetric.

10. The primary optics element according to claim 1, wherein the first longitudinal face of the light outlet has two subsections having main extent directions inclined with respect to one another such that they include an angle of less than or equal to 170° and greater than or equal to 160° on an outer face of the primary optics element.

11. The primary optics element according to claim 1, wherein the primary optics element has the form of a compound parabolic concentrator (CPC), a compound elliptical concentrator (CEC) or a compound hyperbolic concentrator (CHC).

12. The primary optics element according to claim 1, wherein the reflective surfaces of the primary optics element are in the form of freeform surfaces.

13. The primary optics element according to claim 1, wherein the primary optics element comprises reflective surfaces, with convex curvature.

14. The primary optics element according to claim 1, wherein the cross-sectional area of the primary optics element increases continuously in its profile from the light inlet to the light outlet, or
wherein the primary optics element comprises sections with a cross-sectional area that increases continuously in the profile to the light outlet, and sections with a constant cross-sectional area.

15. The primary optics element according to claim 1, wherein, at least in one section on the light inlet side, the primary optics element has a plurality of light channels arranged alongside one another and extending in the direction of the light outlet, each of the plurality of light channels have a round cross section and merge into one another at the sides.

16. The primary optics element according to claim 15, wherein the light channels run together in the path to the light outlet, such that at least one light channel merges completely into the other light channels.

17. A lighting means comprising:
a light source; and
an optical apparatus disposed downstream from the light source in an emission direction and projecting a curved imaginary surface, the optical apparatus comprising a projection lens with a focus area that lies on the imaginary surface; and
a primary optics element with a light inlet and a light outlet disposed between the light source and the optical apparatus.

18. The lighting means according to claim 17, wherein the light source emits white light.

19. The lighting means according to claim 17, wherein the optical apparatus is a lens or a lens assembly.

20. The lighting means according to claim 17, wherein the primary optics element has the form of a non-imaging concentrator which, compared with a normal use of a concentrator, is adapted for radiation to pass through in the opposite direction, with a light outlet of the primary optics element, seen in a plan view, having a long shape with a first longitudinal face opposite to a second longitudinal face, with the first longitudinal face being closer to the light inlet than the second longitudinal face.

21. The lighting means according to claim 17, further comprising a predetermined emission characteristic comprising a light beam having an inhomogeneous luminance distribution in a cross section at right angles to a main emission direction.

22. The lighting means according to claim 21, wherein the light beam has a brightest area at an edge of the cross section.

23. The lighting means according to claim 21, wherein the light beam has an abrupt light/dark transition at an edge of the cross section.

24. The lighting means according to claim 23, wherein the abrupt light/dark transition has two subsections each having main extent directions inclined with respect to one another such that the main extent directions include an angle of less than or equal to 170° or greater than or equal to 160° on an outer face of the cross section of the light beam.

25. The lighting means according to claim 17, wherein the light source comprises at least one light-emitting diode (LED).

26. The lighting means according to claim 25, wherein the light source comprises a plurality of light-emitting diodes, which are arranged in a linear arrangement.

27. The lighting means according to claim 25, wherein the light inlet comprises a light inlet surface or defines a light inlet opening which has a width of less than or equal to 1.5 times the lateral extent of the light-emitting diode or light-emitting diodes, the lateral extent of the light-emitting diode or light-emitting diodes being measured along the width of the light inlet surface or light inlet opening.

28. The lighting means according to claim 25, wherein the light-emitting diode comprises a radiation-emitting semiconductor body and a luminescence conversion element, the luminescence conversion element at least partially converting radiation produced by the semiconductor body to radiation of a different wavelength.

29. The lighting means according to claim 28, wherein the radiation which is produced by the semiconductor body and the radiation which is produced by the luminescence conversion element are mixed in the primary optics element.

30. The lighting means according to claim 28, wherein the luminescence conversion element is applied to the semiconductor body.

* * * * *